(No Model.)
E. J. GARRARD.
CHAIN GEARING.
No. 491,420. Patented Feb. 7, 1893.
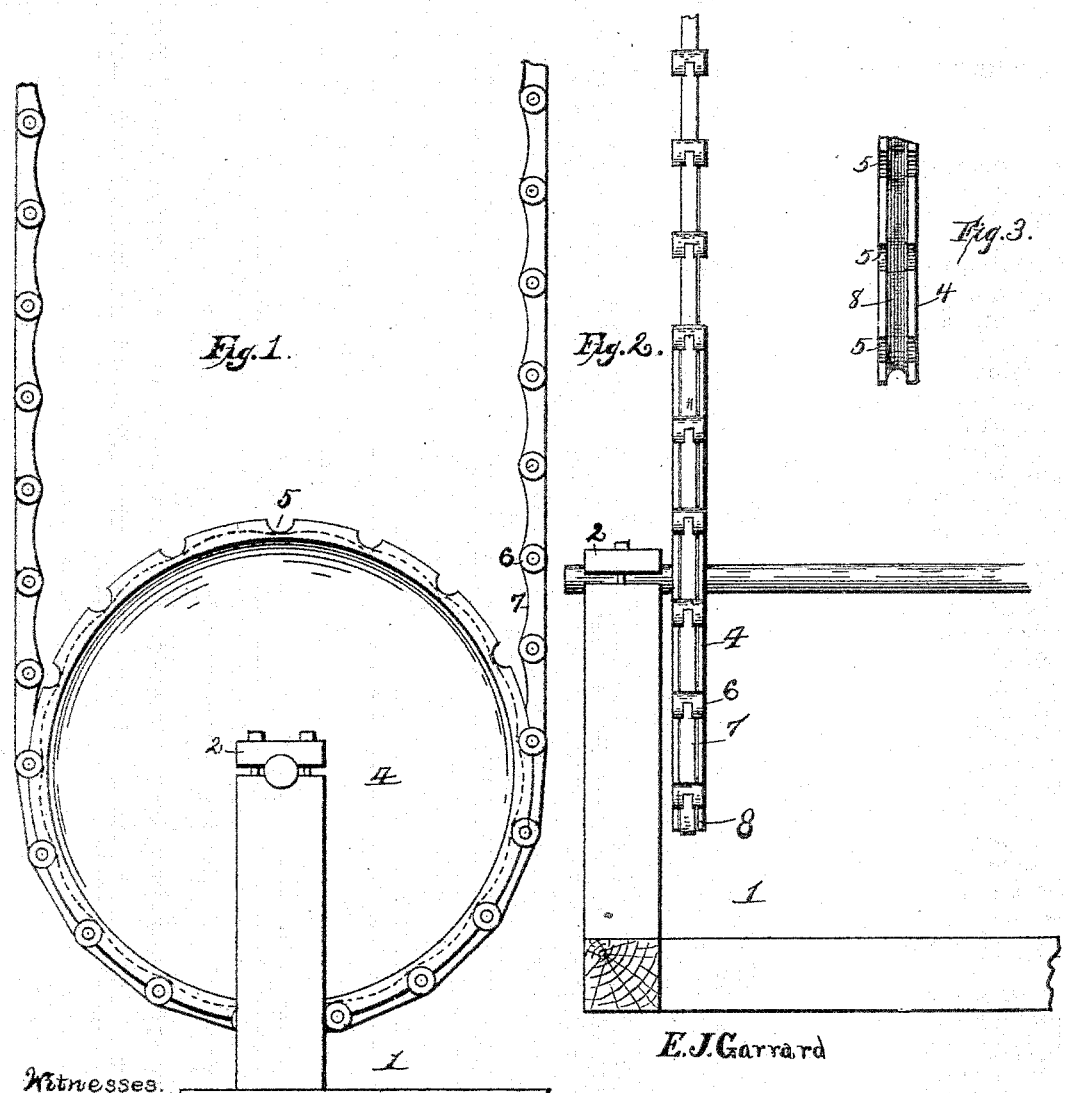
E. J. Garrard
Inventor

UNITED STATES PATENT OFFICE.

EDWARD J. GARRARD, OF FRANKLIN, PENNSYLVANIA.

CHAIN-GEARING.

SPECIFICATION forming part of Letters Patent No. 491,420, dated February 7, 1893.

Application filed June 23, 1892. Serial No. 437,748. (No model.)

*To all whom it may concern:*

Be it known that I, EDWARD J. GARRARD, of Franklin, county of Venango, State of Pennsylvania, have invented certain new and useful Improvements in Chain-Gearing, of which the following is a specification, reference being had to the accompanying drawings.

The object of my invention is to produce a chain gearing of new and improved construction that is especially adapted for operation in lifting heavy weights, such as mortar hods in elevators or the like, and it consists in such an arrangement and construction of the several parts, as will be hereinafter specified in detail and distinctly described in the appended claim.

In the accompanying drawings: Figure 1 is a side elevation of my wheel, showing a chain attached as in use, and showing the curvature of the peripheral grooves between the notches which are adapted to receive the knuckles of the chain. Fig. 2 is a view taken at right angles to that shown in Fig. 1. Fig. 3 shows a detached view of a section of the periphery of the wheel, clearly showing the grooves therein.

Referring to the figures on the drawings: 1, indicates a frame provided with bearings 2, in which is mounted on a journal frame, a wheel 4. The wheel may be made in any suitable manner and may consist of a frame, if desired, or two wheels joined together by rods parallel with the axle to adapt the two wheels to revolve as one to constitute in effect but a single wheel. The periphery of the wheel is made preferably grooved, and is provided with notches 5, at suitable intervals, in the walls of said groove, and having intervening, unbroken surfaces, and adapted to receive the knuckles 6 of a chain, consisting of links curved to suit the periphery of the wheel they are to engage, and each having a body portion 7, that is adapted to fit the groove 8, in the periphery of the wheel.

In use these chains are made endless and a wheel, similar in all respects to the one above described, is mounted at a distance as an idle wheel, over which the chain is guided in its route. The second wheel, which is not necessary to illustrate in the drawings, being, as stated, the exact counter-part of the one shown, is usually mounted vertically above the first wheel and is adapted to carry the chain around it so as to lift up to it any article that may be attached to the chain.

In practice, suitable carriers are generally fastened to the chain as a means for adapting it for elevating purposes, but these are not necessary to illustrate in the drawings, or describe in this specification.

What I claim is:—

A chain wheel having a peripheral groove and provided with notches in the walls thereof, with intervening unbroken surfaces between said notches, in combination with a sectional chain, the links of which are provided with curved body portions having knuckles at opposite ends, said curved body portions adapted to engage the curvature of said peripheral groove, and the knuckles engaging the notches therein; substantially as and for the purpose specified.

In testimony of all which I have hereunto subscribed my name.

EDWARD J. GARRARD.

Witnesses:
WILLIAM GARRARD,
JOSEPH L. ATKINS.